United States Patent Office 3,729,555
Patented Apr. 24, 1973

3,729,555
ANTIBIOTIC COMPOSITION
Boris Gradnik, Milan, Italy, assignor to
MIDY, Paris, France
No Drawing. Filed Oct. 22, 1971, Ser. No. 191,792
Claims priority, application France, Oct. 28, 1970,
7038890
Int. Cl. A61k 21/00
U.S. Cl. 424—114                                    7 Claims

ABSTRACT OF THE DISCLOSURE

Antibiotic composition comprising as active ingredients from 30 to 45% by weight of penicillin G and from 70 to 55% by weight of metampicillin. This composition is active against both gram-positive and gram-negative bacteria, including the penicillinase producing Staphylococci; has a synergistic action against gram-positive and a number of gram-negative bacteria and is able to give extraordinarily high antibiotic bile levels.

FIELD OF THE INVENTION

The present invention relates to an antibiotic composition having a broad spectrum of antibacterial activity and, more particularly, to a synergistic composition containing penicillin G and metampicillin.

BACKGROUND OF THE INVENTION

It is generally well known that penicillin G exhibits a remarkable activity against the gram-positive micro-organisms, but it is also known that it has no activity against the gram-negative micro-organisms. Furthermore, it is very sensible to the inactivation due to penicillinase.

It is also known that, in order to obtain broad-spectrum antibiotic preparations, associations of penicillin G with other antibiotics have been proposed. Such preparations, however, involve an increase of toxicity and can frequently give rise to side effects, such as to an ototoxicity, or to a resistance of possibly present mycobacteria, as observed in the case of penicillin-streptomycin associations which are the most commonly used.

Quite recently, an association of ampicillin (or hetacillin) with dicloxacillin has been proposed (U.S. Pat. 3,317,385), which has the property of being effective against both gram-positive and gram-negative bacteria.

SUMMARY OF THE INVENTION

It has now been found that by association of metampicillin with penicillin G there is obtained a novel antibiotic composition having an improved activity.

More particularly, it has been found that penicillin G has a synergistic effect on the metampicillin. It provides a great increase of the activity against the gram-positive micro-organisms as well as, surprisingly, against certain gram-negative micro-organisms which as well known, are insensible to the action of penicillin G.

It is an object of the present invention to provide an improved antibiotic composition which is non-toxic and active against both gram-positive and gram-negative bacteria, particularly against the penicillinase-producing Staphyloccoci.

The antibiotic composition of the present invention, which comprises the natural penicillin (penicillin G) in association with a semi-synthetic penicillin (metampicillin), shows a synergistic action against the gram-positive bacteria and against a number of gram-negative bacteria, particularly against *Shigella dysenteriae*, Aerobacters, *Salmonella tiphi*, *Hemofilus infl.* and certain Proteus.

Moreover the composition of the present invention has a very high bile tropism in mammals, which results in extremely high antibiotic bile levels, particularly useful in the treatment of certain infective diseases of intestine and of the hepato-biliary tract.

Thus, it is a further object of the present invention to provide a process for treating a bacterial disease in mammals, which comprises administering to the bacterial host an effective amount of an antibiotic composition as hereinbelow defined.

Other objects of the present invention will be apparent to those skilled in the art.

The composition of the present invention comprises from about 30% to about 45% by weight of penicillin G or of a pharmaceutically acceptable salt thereof and from about 70% to about 55% by weight of a therapeutically acceptable salt of metampicillin, alone or in association with a pharmaceutical carrier.

DETAILED DESCRIPTION OF THE INVENTION

Metampicillin is the International Non-proprietary Name of D-(—)-6-[α-(methyleneamino)-phenylacetamido]-penicillanic acid, a semisynthetic penicillin which is obtained in form of its salts i.e. by condensing formaldehyde with ampicillin (Atti VIII Congresso Soc. Ital. Chemioterapia, Sassari May 8–10, 1970—Il Farmaco, Sci. Ed. 26, 520; 1971).

Penicillin G is introduced in the composition of the present invention as such or in the form of its pharmaceutically acceptable salts, particularly in the form of its alkali metal salts, such as sodium salt. Metampicillin is preferably introduced in the composition of the present invention in the form of its sodium salt, but another pharmaceutically acceptable salt thereof may be advantageously used, for example the potassium salt, an alkaline-earth metal salt, i.e. calcium salt or a salt with a pharmaceutically acceptable organic base.

As set forth above, the composition of the present invention can contain from about 30% to about 45% by weight of penicillin G or of a salt thereof and from about 70% to about 55% by weight of a salt of metampicillin. According to a preferred embodiment, the composition of the present invention contain 37.5% by weight of sodium penicillin G and 62.5% by weight of sodium metampicillin.

In form of unit dosage, the composition of the invention can contain from about 100 to about 400 mg. of penicillin G or of a salt thereof and from about 120 to about 630 mg. of a salt of metampicillin in the proportion given by the above percentage intervals. A preferred composition in unit dosage form comprises 300 mg. of sodium penicillin G and 500 mg. of sodium metampicillin.

The composition of the present invention, which is very active in mammals, can be administered to the bacterial host by parenteral route, particularly by intramuscular route or by intravenous injection or perfusion, preferably in water solution.

Table I shows the Minimum Inhibitory Concentrations (M.I.C.) of the single compounds (metampicillin-Na and penicillin G-Na) and of a mixture thereof according to the present invention against many clinically isolated gram-positive and gram-negative bacteria and several penicillin-resistant bacteria. The last two columns of the table show, respectively, the theoretical M.I.C. of the mixture, calculated according to the percent of the single constituents, and the ratio calculated value/found value, which, when greater than 1, denotes a synergistic effect (A. Cimmino et al. Antibiotics Annual, Ed. H. Welch, F. Marti Ibanez—Medical Encyclopaedia, Inc., New York, 1958, page 708).

TABLE I

| | M.I.C. in mcg./ml. | | | | |
|---|---|---|---|---|---|
| | | | Mixture metampicillin-Na (62.5%) penicillin G-Na (37.5%) | | |
| Micro-organisms | Metampi- cillin Na | Penicillin G-Na | Found | Theoretic | Theoretic/ found |
| Gram+ | | | | | |
| Streptococcus pyogenes ATCC 12352 | 0.02 | 0.01 | 0.01 | 0.014 | 1.40 |
| Streptococcus lactis s.p | 3.00 | 4.00 | 2.00 | 3.31 | 1.65 |
| Streptococcus faecalis ATCC 10541 | 3.00 | 3.00 | 2.00 | 3.00 | 1.50 |
| Streptococcus faecalis ATCC 9790 | 0.20 | 0.40 | 0.20 | 0.24 | 1.20 |
| Streptococcus faecalis ATCC 8043 | 1.00 | 2.00 | 0.80 | 1.231 | 1.54 |
| Streptococcus faecalis s,p | 0.30 | 0.20 | 0.10 | 0.218 | 2.18 |
| Diplococcus pneumoniae s.p | 0.05 | 0.03 | 0.01 | 0.053 | 5.30 |
| Sarcina lutea s.p | 0.08 | 0.06 | 0.06 | 0.071 | 1.18 |
| Sarcina aurantiaca s,b | 0.60 | 0.30 | 0.30 | 0.43 | 1.43 |
| Staphylococcus aureus 209 P/FDA | 0.20 | 0.06 | 0.06 | 0.26 | 4.33 |
| Staphylococcus aureus ATCC 6538 | 0.08 | 0.04 | 0.04 | 0.058 | 1.45 |
| Staphylococcus albus s.pp | 0.40 | 0.06 | 0.08 | 0.129 | 1.61 |
| Gram—: | | | | | |
| Escherichia coli K 46 | 4.00 | 80 | 6.00 | 6.2 | 1.00 |
| Aerobacter acrogenes s.p | 4.00 | 10 | 4.00 | 5.18 | 1.30 |
| Proteus hauseri s.p | 8.00 | 520 | 10.00 | 12.68 | 1.36 |
| Salmonella typhi 107 | 0.50 | 2.00 | 0.50 | 0.69 | 1.40 |
| Shigella dysenteriae Shiga | 0.50 | 1.00 | 0.50 | 0.62 | 1.24 |
| Shigella flexneri s.p | 0.50 | 1.00 | 0.50 | 0.62 | 1.24 |
| Haemophilus influenzae | 3.00 | 5.00 | 2.00 | 3.52 | 1.76 |

Table I shows that the mixture of penicillin G and metampicillin according to the present invention has a synergistic action against the examined micro-organisms.

Protection tests in vivo have also been carried out by experimental infection in mouse. To this purpose, animals were infected using 0.25 ml. of a 24 hours old culture of Streptococcus faecalis in "Fluid Thioglycolate Medium" (DIFCO) and 0.25 ml. of a 24 hours old culture of Escherichia coli in "Nutrient Broth" (DIFCO) by intra-peritoneal route and the products under examination were administered by subcutaneous route one hour after the infection.

Median protective doses ($PD_{50}$) at three different dosage levels are shown (in mg./kg.) in Table II.

TABLE II

Mixed experimental infection in mouse by Str. faecalis plus E. coli

| Product | Dose, mg./kg. | Number animals | Percent mortality within 48 hrs. | $PD_{50}$, mg./kg. |
|---|---|---|---|---|
| Penicillin G-Na | 5 | 20 | 90 | |
| | 10 | 20 | 70 | 20 |
| | 20 | 20 | 70 | |
| Metampicillin-Na | 5 | 20 | 70 | |
| | 10 | 20 | 40 | 86 |
| | 20 | 20 | 10 | |
| Mixture | 5 | 20 | 50 | |
| Penicillin G-Na, 37.5% | 10 | 20 | 30 | 5.23 |
| Metampicillin Na, 62.5% | 20 | 20 | 10 | |

[1] Bliss, Quart. J. Pharm. and Pharmacol. 11, 192 (1938).

Table II shows that penicillin G has practically no protective action against the two associated micro-organisms, while the mixture penicillin G-metampicillin has a very high protective action, by far superior to that of metampicillin alone.

The mixture penicillin G-metampicillin thus shows a broadened spectrum in respect to penicillin G and a synergistic action in respect of metampicillin.

The antibiotic bile levels obtainable by administration of the composition of the present invention were compared with those achieved after administration, under the same conditions, of the 2:1 mixture of ampicillin and dicloxacillin disclosed in U.S. Pat. 3,317,389.

The products under examination were administered by slow intraveous perfusion in saline to rabbits at a dose corresponding to 50 mg./kg. of ampicillin. The animals, duly anesthetized, were perfused by jugular route. After laparotomy a polyethylene catheter was inserted in the bile duct. The bile was collected every ten minutes over periods of an hour and the antibiotic bile levels were determined with the microbiological method on agar plates seeded with Sarcina lutea.

Table III shows the antibiotic bile levels, in mcg./ml., after administration of a mixture according to the present invention and a 2:1 mixture of ampicillin and dicloxacillin according to U.S. Pat. 3,317,389.

TABLE III

| | Antibiotic bile levels (in mcg./ml.) medium value, 8 rabbits | | | | | |
|---|---|---|---|---|---|---|
| Time in minutes | 10 | 20 | 30 | 40 | 50 | 60 |
| Product: | | | | | | |
| Mixture: Penicillin G-Na, 37.5% Metampicillin-Na, 62.5% | 690 | 3,950 | 4,500 | 4,500 | 4,500 | 4,500 |
| Dicloxacillin, 1 part b.w. Ampicillin, 2 parts b.w. | 21 | 90 | 167.5 | 210 | 225 | 260 |

From this table it become readily apparent that the composition of the present invention provides antibiotic bile levels extraordinarily high, even 20 to 40 fold higher than those achieved after administration of a 2:1 mixture of ampicillin and dicloxacillin.

In order further to illustrate the invention the following examples are given:

EXAMPLE 1

| | Mg. per vial |
|---|---|
| Sodium metampicillin | 500 |
| Sodium penicillin G | 300 |
| Sodium chloride | 18 |

Prior to use add 4 ml. water for injection.

EXAMPLE 2

| | Mg. per vial |
|---|---|
| Sodium metampicillin | 250 |
| Sodium penicillin G | 150 |
| Sodium chloride | 9 |

Prior to use add 3 ml. water for injection.

I claim:
1. An antibiotic composition for treating a bacterial disease in a mammal comprising a mixture of (a) 37.5% by weight of a member selected from the groups consisting of penicillin G and a pharmaceutically acceptable alkali metal salt thereof and (b) 62.5% by weight of a pharmaceutically acceptable alkali metal salt of metampicillin.
2. A composition as claimed in claim 1 comprising 37.5% by weight of sodium penicillin G and 62.5% by weight of sodium metampicillin.
3. A composition as claimed in claim 1 which is in unit dosage form and comprises 300 mg. of a member selected from the groups consisting penicillin G and a pharmaceutically acceptable alkali metal salt thereof and 500 mg. of a pharmaceutically acceptable alkali metal salt of metampicillin.
4. A composition as claimed in claim 1 which is in unit dosage form and comprises 300 mg. of sodium penicillin G and 500 mg. of sodium metampicillin.
5. A composition as claimed in claim 1 which additionally contains a pharmaceutical carrier.
6. A process for treating a bacterial disease in a mammal which comprises administering to mammal suffering from a bacterial disease an antibacterially effective amount of an antibiotic composition comprising a mixture of (a) 37.5% by weight of a member selected from the groups consisting of penicillin G and a pharmaceutically acceptable alkali metal salt thereof and (b) 62.5% by weight of a pharmaceutically acceptable alkali metal salt of metampicillin.
7. A process for treating a bacterial disease in a mammal which comprises administering to a mammal suffering from a bacterial disease an antibacterially effective amount of an antibiotic composition consisting of a mixture of 37.5% by weight of sodium penicillin G and 62.5% by weight of sodium metampicillin.

References Cited

FOREIGN PATENTS 661,232   7/1965   Belgium _____ 424—271

OTHER REFERENCES

Chemical Abstracts 71: 48205p (1969).
Chemical Abstracts 71: 111372h (1969).
Merck Index, 8th Edition, Merck & Co., Inc., 1968, pages 140–141.

JEROME D. GOLDBERG, Primary Examiner

U.S. Cl. X.R.

424—271